United States Patent
Lee et al.

(10) Patent No.: US 9,102,062 B2
(45) Date of Patent: Aug. 11, 2015

(54) APPARATUS AND METHOD FOR PLANNING PATH OF ROBOT, AND THE RECORDING MEDIA STORING THE PROGRAM FOR PERFORMING THE METHOD

(71) Applicant: SAMSUNG TECHWIN CO., LTD., Changwon (KR)

(72) Inventors: Jin-han Lee, Changwon (KR); Min-Hyuk Kwon, Changwon (KR)

(73) Assignee: SAMSUNG TECHWIN CO., LTD., Changwon (KR)

( * ) Notice: Subject to any disclaimer, the term of this patent is extended or adjusted under 35 U.S.C. 154(b) by 99 days.

(21) Appl. No.: 13/932,500

(22) Filed: Jul. 1, 2013

(65) Prior Publication Data

US 2014/0121833 A1    May 1, 2014

(30) Foreign Application Priority Data

Oct. 30, 2012    (KR) .......................... 10-2012-0121520

(51) Int. Cl.
*B25J 9/16* (2006.01)

(52) U.S. Cl.
CPC ..... *B25J 9/1666* (2013.01); *G05B 2219/39091* (2013.01); *Y10S 901/01* (2013.01)

(58) Field of Classification Search
CPC . G05D 1/0088; G05D 1/0274; G05D 1/0212; G05D 1/0238; G05D 1/0214; G05D 1/024; G05D 1/0255; G05D 1/0278; G05B 2219/39082; G05B 2219/40317; G05B 2219/40476; G05B 2219/40121; G05B 2219/40439; G05B 2219/40463; G05B 2219/40465; G05B 2219/40473; G05B 19/00; G05B 2219/40477; G05B 2219/39091; B25J 9/1666; B25J 9/1664; B25J 9/162; Y10S 901/01

See application file for complete search history.

(56) References Cited

U.S. PATENT DOCUMENTS

| | | | | | |
|---|---|---|---|---|---|
| 5,202,661 | A | * | 4/1993 | Everett et al. | 340/522 |
| 6,442,456 | B2 | * | 8/2002 | Burns et al. | 701/23 |
| 7,079,943 | B2 | | 7/2006 | Flann et al. | |
| 7,636,621 | B2 | * | 12/2009 | Lee et al. | 701/23 |
| 8,175,748 | B2 | * | 5/2012 | Matsumoto et al. | 700/253 |
| 8,447,455 | B2 | * | 5/2013 | Matsunaga | 701/26 |
| 2010/0121517 | A1 | * | 5/2010 | Lee et al. | 701/25 |
| 2010/0174435 | A1 | | 7/2010 | Lim | |
| 2010/0313364 | A1 | * | 12/2010 | Chung et al. | 15/4 |
| 2011/0106307 | A1 | | 5/2011 | Kim et al. | |
| 2012/0165982 | A1 | * | 6/2012 | Kim et al. | 700/255 |

FOREIGN PATENT DOCUMENTS

| | | |
|---|---|---|
| JP | 2009-178782 A | 8/2009 |
| JP | 2011-100306 A | 5/2011 |
| KR | 10-2010-0081824 A | 7/2010 |
| KR | 10-2011-0047844 A | 5/2011 |

* cited by examiner

*Primary Examiner* — Bao Long T Nguyen
(74) *Attorney, Agent, or Firm* — Sughrue Mion, PLLC

(57) ABSTRACT

A method and an apparatus for planning path of robot in correspondence to environment changes in real time, and a recording medium storing the program for performing the said method. The method includes operating the robot according to a first path; generating a second path if an obstacle is discovered around the robot while the robot is being operated according to the first path, and data of the first path exist in a first space within a first distance from a current location of the robot; and operating the robot according to at least the second path.

18 Claims, 14 Drawing Sheets

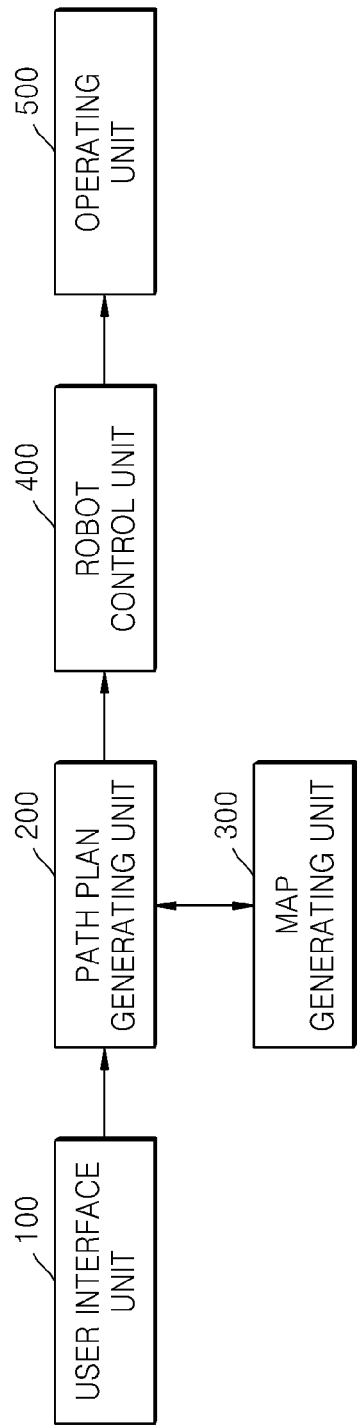

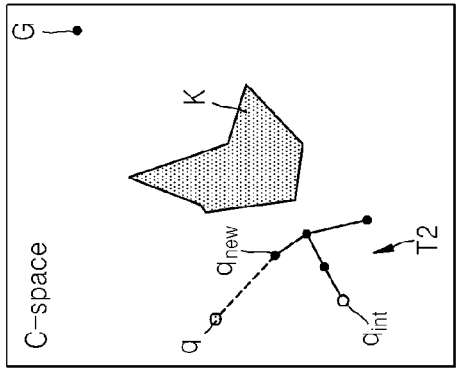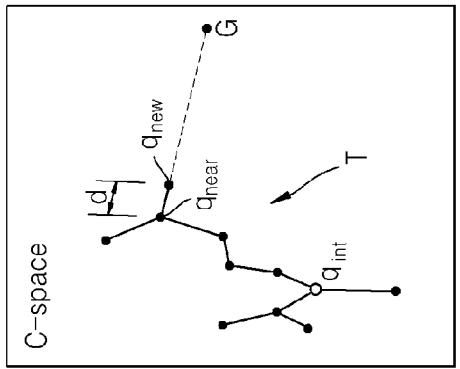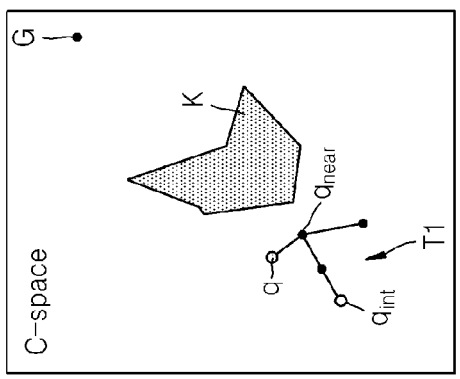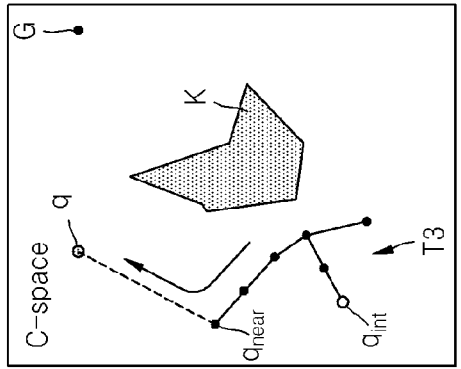

APPARATUS AND METHOD FOR PLANNING PATH OF ROBOT, AND THE RECORDING MEDIA STORING THE PROGRAM FOR PERFORMING THE METHOD

CROSS-REFERENCE TO RELATED APPLICATION

This application claims priority from Korean Patent Application No. 10-2012-0121520 filed on Oct. 30, 2012, in the Korean Intellectual Property Office, the disclosure of which is incorporated herein by reference in its entirety.

BACKGROUND

1. Field

Methods and apparatuses consistent with exemplary embodiments relate to a method and an apparatus for planning path of robot in correspondence to environment changes in real time, and a recording medium storing the program for performing the said method.

2. Description of the Related Art

A robot is a device for automatically performing a particular task or a particular operation and is used for replacing or assisting human in various fields. It is important to control operation of a robot for the robot to perform a given task or a given service. Techniques for controlling operation of robots are based on path planning algorithms. To plan a path of a robot, an environment map regarding a region in which the robot is to be operated is necessary. The robot finds executable paths by using the environment map, selects the most efficient path from among the executable paths, and follows the most efficient path.

Path planning algorithms may include a grid-based path planning and a sampling-based path planning. The grid-based path planning divides an environment map into a grid and plans a path for a robot to operate along the same. The most efficient path may be quickly generated by using a grid-based path planning, but it is difficult to generate a path in real-time if a robot is for a complex task.

Sampling-based path planning finds operable paths in a tree shape by using an environment map and finds a path to a final destination. The sampling-based path planning is used for generating a path based on uncertainty in consideration of dynamics of a complicated robot, instead of finding the most efficient path. However, the sampling-based path planning finds paths without re-using previously found paths. Therefore, it takes long time to generate a path, and thus safety of a robot operation is deteriorated.

SUMMARY

One or more exemplary embodiments provide a method and an apparatus for planning path of robot in correspondence to environment changes in real time, and a recording medium storing the program for performing the said method.

Additional aspects will be set forth in part in the description which follows and, in part, will be apparent from the description, or may be learned by practice of the presented embodiments.

According to an aspect of an exemplary embodiment, there is provided a method of planning a path of a robot, the method including: operating the robot according to a first path; generating a second path if an obstacle is discovered around the robot while the robot is being operated according to the first path, and data of the first path exist in a first space within a first distance from a current location of the robot; and operating the robot according to at least the second path.

The method may further include operating the robot according to the first path if no obstacle is discovered.

The method may further include deleting at least a portion of the first path around the obstacle if the obstacle is discovered around the robot while the robot is being operated according to the first path.

The generating the second path may include: detecting at least one edge interconnecting at least one of first nodes of the first path and an arbitrary first node in the first space; generating a virtual node by equally dividing the at least one edge; setting each of the first node and the virtual node as an intermediate destination; generating an intermediate destination path from the current location of the robot to the intermediate destination; and generating the second path from the current location of the robot to a final destination via the intermediate destination.

The generating the intermediate destination path comprises generating at least one intermediate destination path from the current location of the robot to the intermediate destination by performing a first algorithm.

The first path may have been generated by using a rapidly exploring random tree (RRT) algorithm.

The method may further include: generating a third path if the obstacle is discovered around the robot while the robot is being operated according to the first path, and the data of the first path do not exist in a second space within a second distance from the current location of the robot; and operating the robot according to the third path.

The first distance and the second distance may be set to be the same.

The generating the third path may include: generating at least one node in the second space; setting a location at which the at least one node and another node outside the second space meet as an intermediate destination; generating an intermediate destination path from the current location of the robot to the intermediate destination; and generating the third path from the current location of the robot to a final destination via the intermediate destination path.

According to an aspect of another exemplary embodiment, there is provided a robot path planning apparatus including: a robot operation control unit configured to operate a robot according to a first path; and a path plan generating unit configured to generate a second path if an obstacle is discovered around the robot while the robot is being operated according to the first path, and data of the first path exist in a first space within a first distance from a current location of the robot, and generate at least a second path.

The path plan generating unit may be further configured to generate a third path if the obstacle is discovered around the robot while the robot is being operated according to the first path, and the data of the first path do not exist in a second space within a second distance from the current location of the robot.

The first distance and the second distance may be set to be the same.

The path plan generating unit may be further configured to delete at least a portion of the first path around the obstacle if the obstacle is discovered around the robot while the robot is being operated according to the first path.

The path plan generating unit may be configured to output a signal for maintaining the first path to the robot operation control unit if no obstacle is discovered.

The first path plan generating unit may be configured to generate the first path by using the RRT algorithm.

The path plan generating unit may be configured to generate the second path from the current location of the robot to a final destination via an intermediate destination by setting each of at least one first node according to the first path and a virtual node generated by equally dividing an edge interconnecting arbitrary first nodes as the intermediate destination, generate an intermediate destination path from the current location of the robot to the intermediate destination, and generate the second path from the current location of the robot to the final destination via the intermediate destination.

The path plan generating unit may be configured to generate the intermediate destination path from the current location of the robot to the intermediate destination by performing the RRT algorithm.

The third path plan generating unit may be configured to generate the path by generating at least one node in the second space, set a location at which the at least one node and another node outside the second space meet as an intermediate destination, generating an intermediate destination path from the current location of the robot to the intermediate destination, and generate the third path from the current location of the robot to a final destination via the intermediate destination path.

The path plan generating unit may be configured to generate the intermediate destination path from the current location of the robot to the intermediate destination by performing an algorithm which is different from an algorithm used to generate the at least one node in the second space.

According to an aspect of another exemplary embodiment, there is provided a robot including the robot path planning apparatus described above.

According to an aspect of another exemplary embodiment, there is provided a non-transitory computer readable recording medium having recorded thereon a computer program for implementing the method described above.

BRIEF DESCRIPTION OF THE DRAWINGS

The above and/or other aspects will become apparent and more readily appreciated from the following description of exemplary embodiments, taken in conjunction with the accompanying drawings of which:

FIG. 1 is a block diagram showing the configuration of a robot path planning apparatus according to an exemplary embodiment;

FIGS. 2A-2E illustrate diagrams for describing the RRT algorithm according to an exemplary embodiment;

DETAILED DESCRIPTION

Figure 3A:
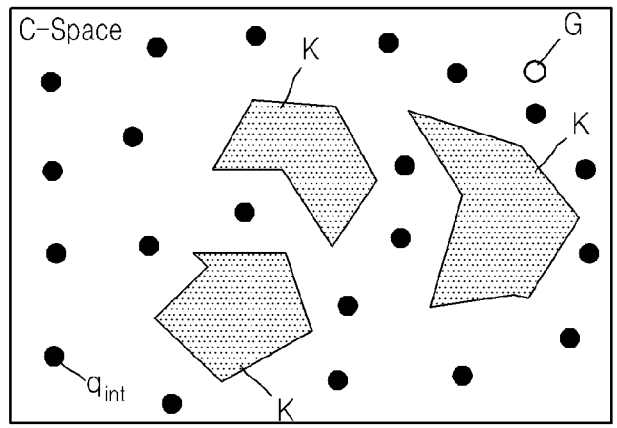
FIGS. 3A-3C illustrates diagrams for describing the PRM algorithm according to an exemplary embodiment.

Reference will now be made in detail to exemplary embodiments, examples of which are illustrated in the accompanying drawings, wherein like reference numerals refer to the like elements throughout. In this regard, the exemplary embodiments may have different forms and should not be construed as being limited to the descriptions set forth herein. Accordingly, the exemplary embodiments are merely described below, by referring to the figures, to explain aspects of the present description.

FIG. 1 is a block diagram showing the configuration of a robot path planning apparatus according to an exemplary embodiment.

Referring to FIG. 1, the robot path planning apparatus includes a user interface unit 100, a path plan generating unit 200, a map generating unit 300, a robot control unit 400, and an operating unit 500.

The user interface unit 100 inputs coordinates of a starting point and a final destination point for a robot to operate. Furthermore, the user interface unit 100 receives a switch operating signal or a voice signal from a user to input operating instructions to the robot.

The path plan generating unit 200 either generates a first path plan or deletes the first path plan around an obstacle in response to the obstacle discovered ahead during an operation of the robot and generates a second path plan or a third path plan from the current location of the robot to the final destination.

The map generating unit 300 generates an environment map according to the path plan generated by the path plan generating unit 200. The map generating unit 300 stores previously a generated path plan and updates the stored generated path plan when the path plan is modified or a new path plan is generated.

The robot control unit 400 outputs robot operation control signals according to the path plan generated by the path plan generating unit 200.

The operating unit 500 operates a robot according to the robot operation control signals from the robot control unit 400.

The robot control unit 400 and the operating unit 500 correspond to a robot operation control unit for operating a robot according to a path plan.

The path plan generating unit 200 generates first, second and third sampling-based path plans. Examples of sampling-based path planning include a rapidly exploring random tree (RRT) algorithm and a probabilistic roadmap (PRM) algorithm.

FIG. 2A through 2E illustrate diagrams for describing the RRT algorithm. The RRT algorithm generates a data tree via a random search in a configuration space (hereinafter "a C-space") and uses the data tree as a path plan for a robot. As shown in FIG. 2A, the RRT algorithm visualizes a tree T in which configuration of a robot is modeled as a single node in a C-space and finds a path that clears limitations from the initial node $q_{int}$ (starting point) to the final destination G. Here, expansion of the tree T involves repetition of selecting the nearest node $q_{near}$ to a randomly sampled node q from nodes of the tree T and selecting a new node $q_{new}$ that is a predetermined distance d away from the nearest node $q_{near}$.

Referring to FIG. 2B, in case of generating a first tree T1 from the initial node $q_{int}$ to the final destination G for avoiding a space K of a C-space that fails to clear constraints (obstacle), the nearest node $q_{near}$ to the sampled node q is found and the first tree T1 is expanded by connecting the sampled node q and the nearest node $q_{near}$ to each other.

Next, a second tree T2 is expanded by connecting the sampled node q and the nearest node $q_{near}$ to each other as shown in FIG. 2C, and a third tree T3 is expanded by connecting the sampled node q and the nearest node $q_{near}$ to each other as shown in FIG. 2D. When a fourth tree T4 is expanded by connecting the sampled node q and the nearest node $q_{near}$ to each other and then including nodes that are predetermined distances d away from the nearest node $q_{near}$ in the fourth tree T4, if a new node $q_{new}$, that is a predetermined distance d away from the nearest node $q_{near}$ is located at a space K that does not clear constraints, expansion of the tree T toward the sampled node q is stopped and a new sampling is initiated. As described above, the RRT algorithm generates a path by expanding trees to clear constraints. Compared to the PRM algorithm described below, the RRT algorithm includes less unnecessary calculations.

Figure 3B:
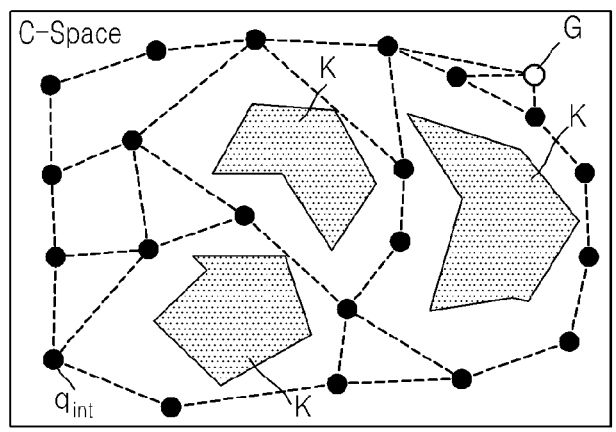
Figure 3C:
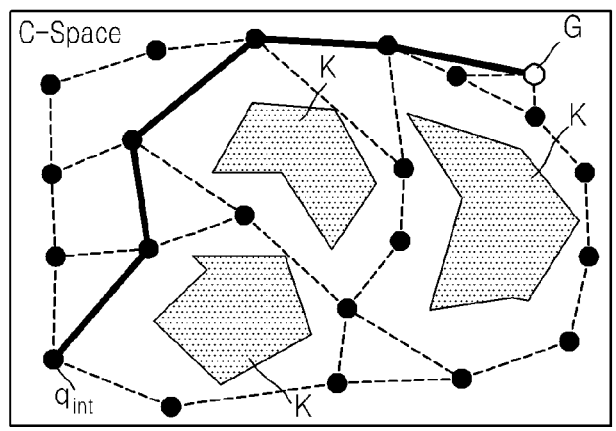

FIGS. 3A-3C are diagrams for describing the PRM algorithm. The PRM algorithm extracts the most efficient path from the starting point $q_{int}$ to the final destination G by generating a roadmap by extracting random collision-avoiding points in a C-space, connecting the collision-avoiding points to one another and calculating costs for operating along the respective paths. The PRM algorithm may rapidly perform collision check and reduces a period of time elapsed for path calculation by avoiding calculation of precise illustration of a C-space. The PRM algorithm consists of two phases including a preprocessing phase in which a roadmap for generating a path plan in a free space of a C-space is generated and a query phase in which a global path is generated via calculations of costs for operating along the respective local paths. However, it is not necessary to perform the query phase after the preprocessing phase.

In the preprocessing phase, a network-style roadmap is generated by extracting random collision-avoiding points in a C-space as shown in FIG. 3A and connecting the collision-avoiding points to one another as shown in FIG. 3B. In the query phase, a combination of local paths constituting the most efficient global path is extracted by connecting a starting point $q_{int}$ and a final destination G based on the roadmap, as shown in FIG. 3C.

Figure 4:
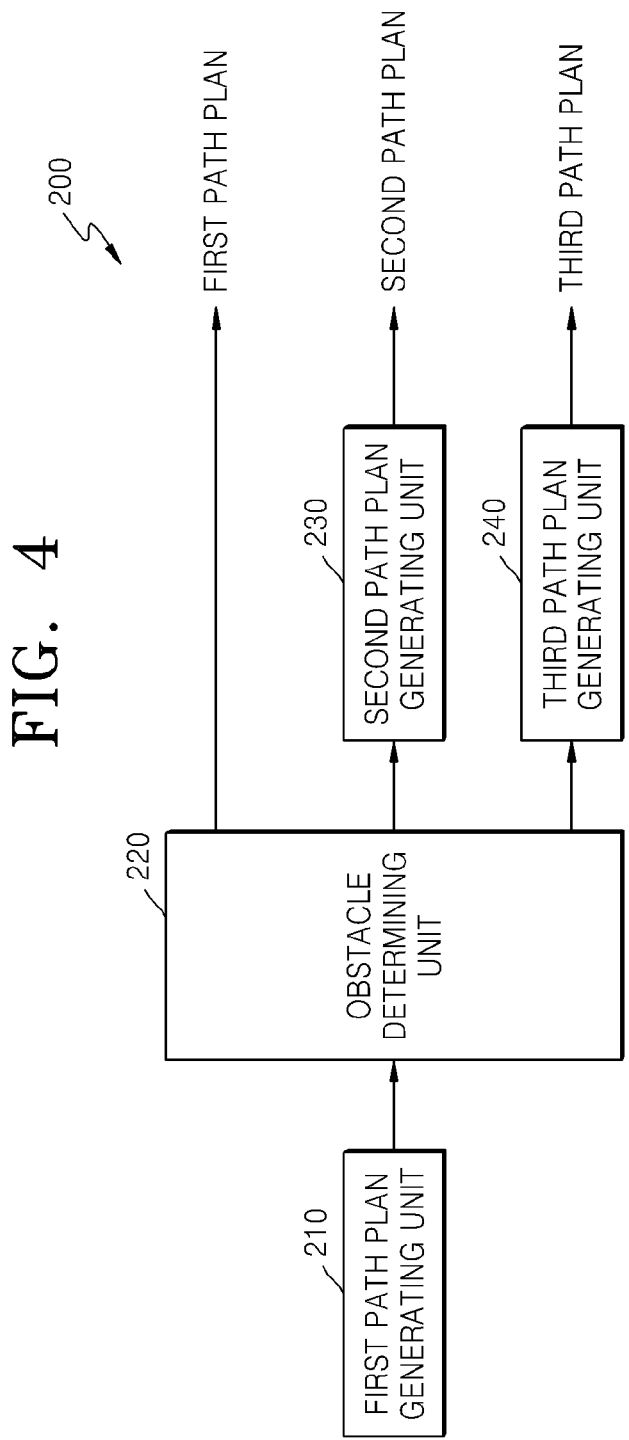
FIG. 4 is a diagram showing the configuration of the path plan generating unit 200 in detail according to an exemplary embodiment.

FIG. 4 is a diagram showing the configuration of the path plan generating unit 200 in detail according to an exemplary embodiment. Referring to FIG. 4, the path plan generating unit 200 includes a first path plan generating unit 210, an obstacle determining unit 220, a second path plan generating unit 230, and a third path plan generating unit 240.

The first path plan generating unit 210 generates a first path plan for a robot by using the RRT algorithm shown in FIGS. 2A-2E. If a previous path plan is stored in the map generating unit 300, a path satisfying predetermined conditions in the previous path plan is generated as the first path plan. If no previous path plan is stored in the map generating unit 300, the first path plan is generated by using the RRT algorithm.

The first path plan generating unit 210 generates a C-space having a starting point and a final destination point for operating the robot, selects the closest sampling node to the starting point from among arbitrary nodes that are randomly sampled, and connects the selected sampling node to the starting point via an imaginary line. If a sampling node satisfies constraint conditions, tree expansion by including a sampling node to a tree is repeated toward the final destination point, and an imaginary line between sampling nodes that satisfies predetermined conditions from a tree, which interconnects the starting point and the final destination and includes a plurality of path plans, is generated as the first path plan.

Here, the predetermined conditions may include the shortest path from the starting point to the final destination. Alternatively, if scores are set to lengths of paths from the starting point to the final destination, a path corresponding to the lowest score may be set as the predetermined conditions. However, the exemplary embodiment is not limited thereto.

The first path plan generated by the first path plan generating unit 210 is an initial robot operating path plan, where the robot control unit 400 outputs control signals using the first path plan, and the operating unit 500 operates a robot according to the control signals based on the first path plan.

Figure 5A:
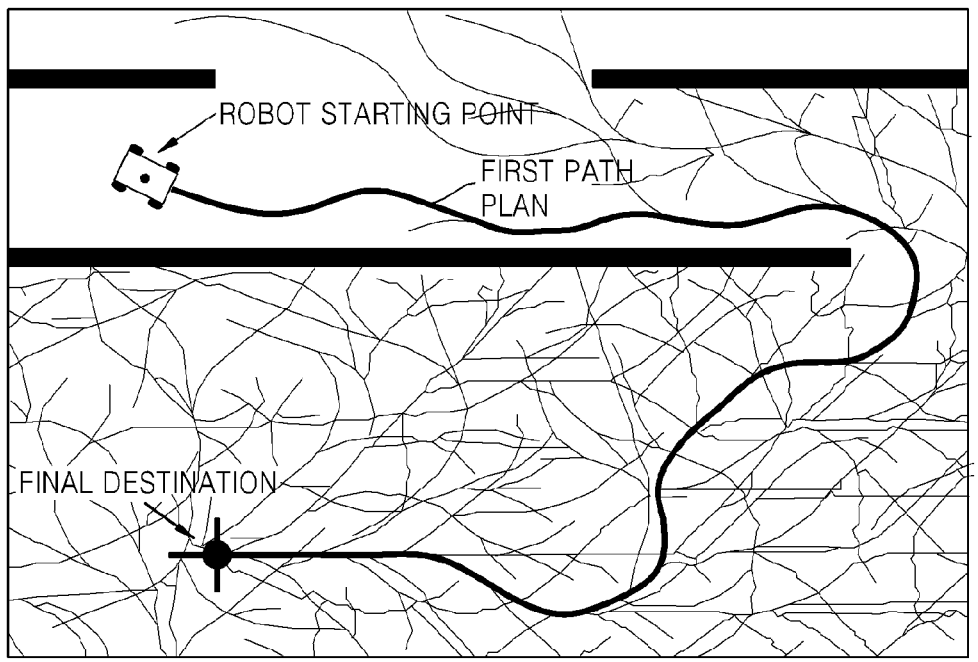
FIGS. 5A and 5B illustrate diagrams showing movement of a robot according to a first path plan in FIG. 1 according to an exemplary embodiment.
Figure 5B:
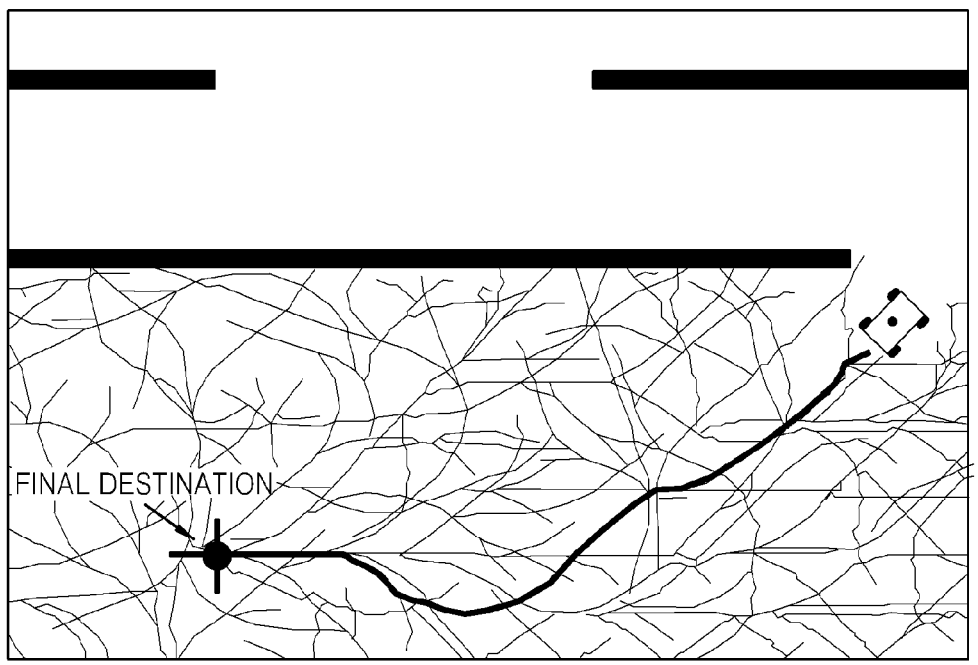

FIG. 5A shows a first path plan generated by using the RRT algorithm, and FIG. 5B is a diagram showing operation of a robot according to the first path plan. In FIG. 5B, while the robot is being operated according to the first path plan, past operating paths may be deleted.

Figure 6A:
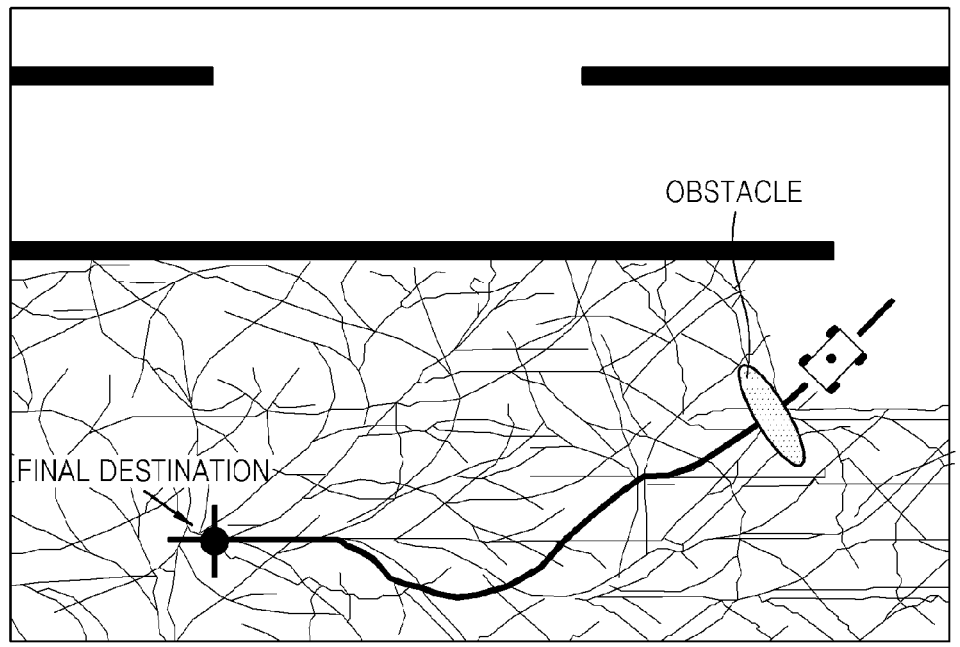
FIGS. 6A and 6B illustrate diagrams showing reaction of a robot regarding an obstacle during movement of the robot in FIG. 1 according to an exemplary embodiment.

The obstacle determining unit 220 determines discovery of an obstacle interfering operation of the robot in an environment map during operation according to the first path plan. The robot includes a sensor (not shown) and is capable of discovering obstacles ahead. According to an exemplary embodiment, the obstacle determining unit 220 may determine discovery of an obstacle by comparing the obstacle discovered by the obstacle determining unit 220 to an environment map stored in the map generating unit 300. FIG. 6A is a diagram showing that an obstacle is discovered ahead while the robot is being operated according to the first path plan.

Figure 6B:
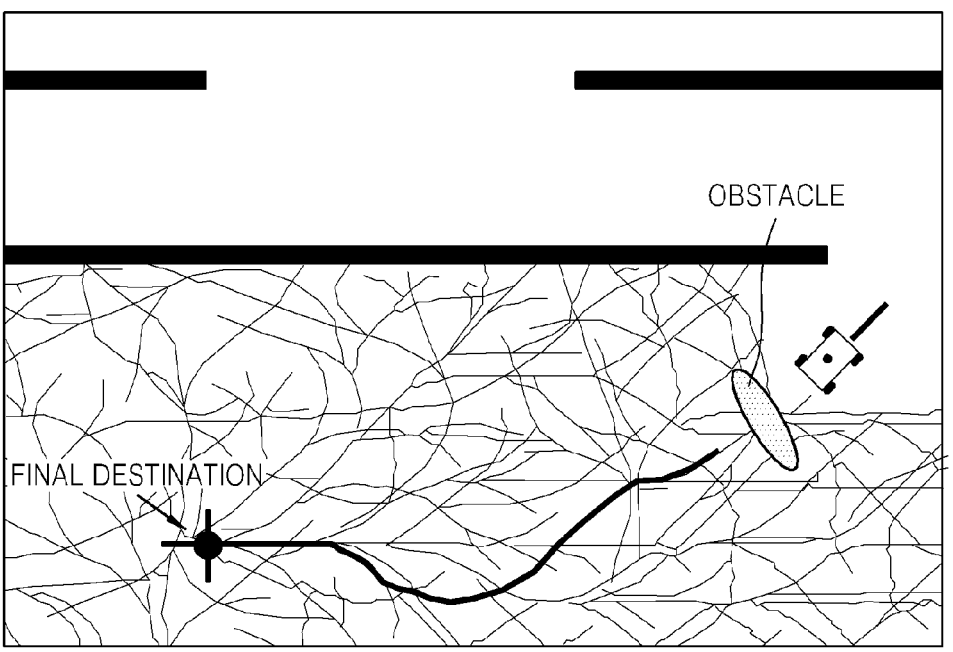

In response to the discovery of the obstacle interfering operation of the robot in the environment map, the obstacle determining unit 220 deletes a portion of the first path plan around the obstacle. FIG. 6B is a diagram showing the first path plan in which the portion around the obstacle is deleted. However, According to an exemplary embodiment, the first path plan may be maintained for a later use without the portion being deleted, for example, in a case where the obstacle is removed.

If the obstacle determining unit 220 does not determine discovery of an obstacle during operation of the robot according to the first path, that is, no obstacle is discovered, the robot is continuously operated to the final destination according to the first path plan.

The second path plan generating unit 230 determines whether first path plan data exists in a first space A within a first predetermined distance from the current location of the robot. If first path plan data exists in the first space, the second path plan generating unit 230 generates a second path plan. Here, the first space A is indicated as a circle in FIG. 7A, where the predetermined distance to form the first space A from the current location of the robot is set in advance in consideration of velocity of the robot and size of an obstacle.

Figure 7A:
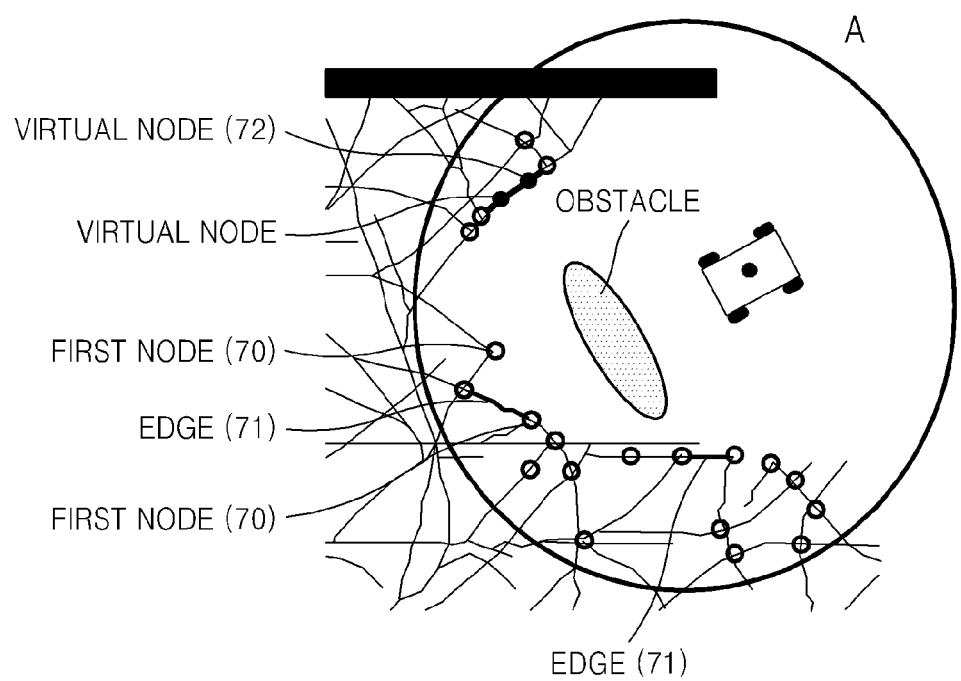
FIGS. 7A-7D illustrate diagrams showing generation of a second path plan and movement of a robot according to the second path plan in FIG. 1 according to an exemplary embodiment.

The second path plan generating unit 230 generates the second path plan in a case where first path plan data exists in the first space A, as shown in FIG. 7A. Here, the first path plan may include at least one edge interconnecting at least one of the first node 70 generated by the RRT algorithm and the arbitrary first node 70.

The second path plan generating unit 230 generates at least one virtual node 72 by equally dividing the edge 71 and sets the first node 70 and the virtual node 72 as at least one intermediate destination 73.

Figure 7B:
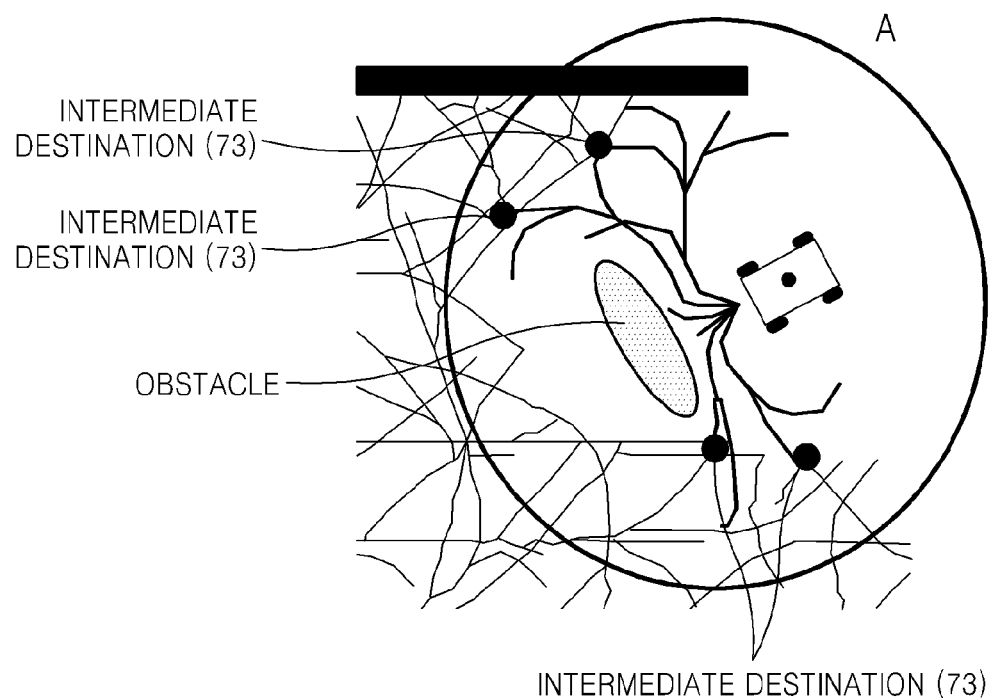

Next, the second path plan generating unit 230 generates an intermediate destination path plan from the current location of the robot to the intermediate destination 73. To generate the intermediate destination path plan from the current location of the robot to the intermediate destination 73, the second path plan generating unit 230 generates at least one intermediate destination path plan by performing the first algorithm, that is, the RRT algorithm. FIG. 7B shows an intermediate destination path plan from the current location of the robot to the intermediate destination 73 that is generated by using the RRT algorithm.

The second path plan generating unit 230 selects the most efficient intermediate destination path plan from among the at least one intermediate destination path plan.

Figure 7C:
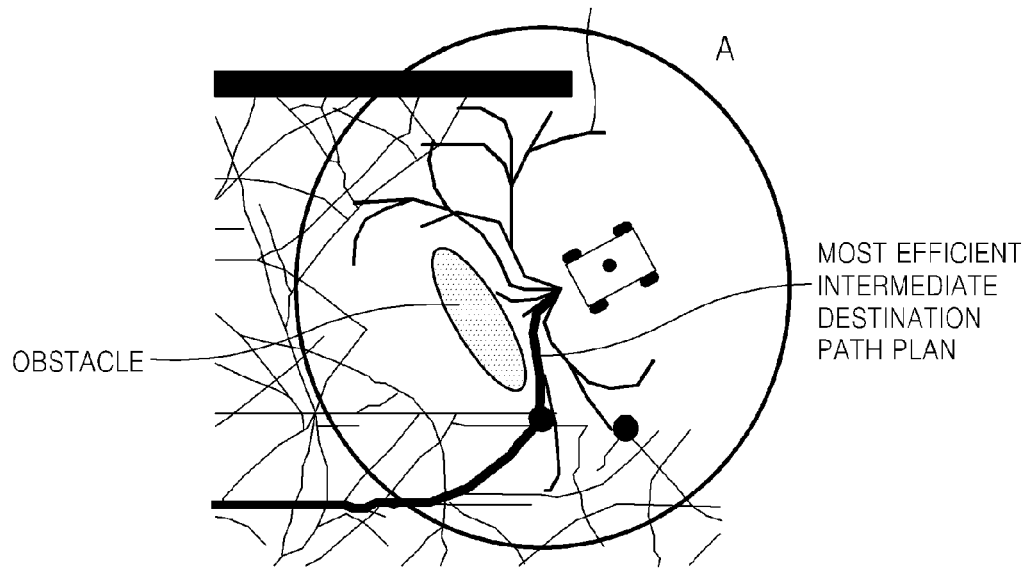

Here, the shortest path from the current location of the robot to the starting point to the intermediate destination or, if scores are set to lengths of paths, a path corresponding to the lowest score may be selected as the most efficient intermediate destination path plan. However, the exemplary embodiment is not limited thereto. FIG. 7C shows the most efficient intermediate destination path from the current location of the robot to the intermediate destination.

The second path plan generating unit 230 generates a final second path plan from the current location of the robot to the final destination via the selected intermediate destination path. In other words, the final second path plan is a path plan for operating the robot from the starting point $q_{int}$ according to the first path plan before the obstacle is discovered, operating the robot to the intermediate destination according to the second path plan after the obstacle is discovered, and operating the robot from the intermediate destination to the final destination.

Figure 7D:
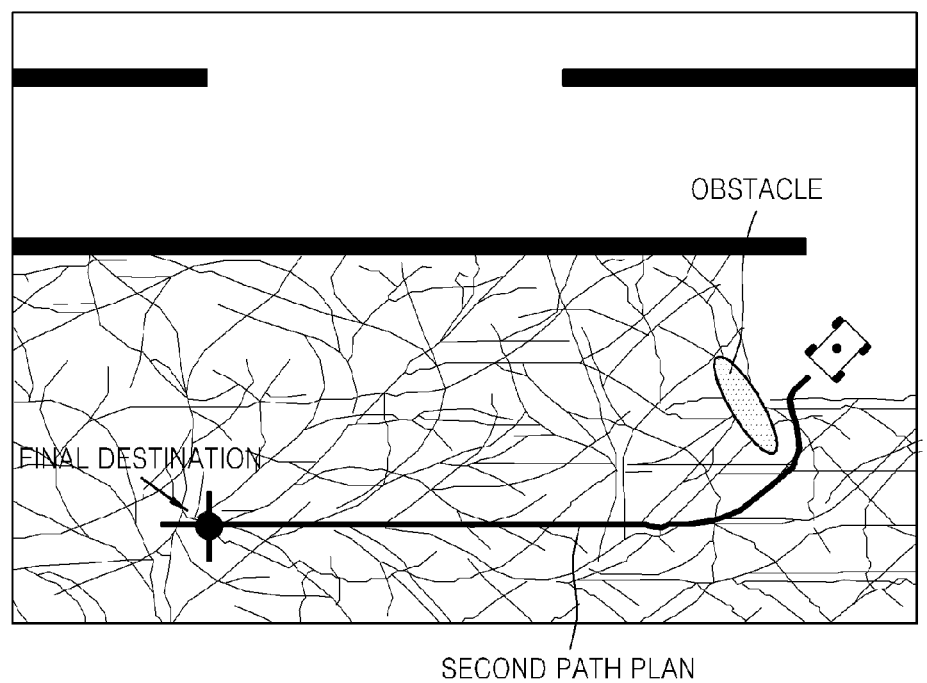

After the second path plan is generated, the second path plan generating unit 230 updates the map generating unit 300. The second path plan generated by the second path plan generating unit 230 is output to the robot control unit 400, the robot control unit 400 outputs control signals for operating the robot by using the second path plan, and the operating unit 500 operates the robot according to the control signals based on the second path plan. FIG. 7D is a diagram showing operation of a robot according to a second path plan.

Figure 8A:
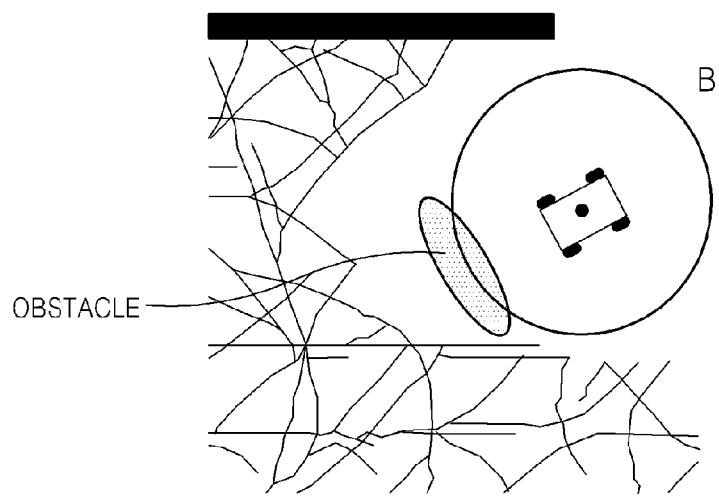
FIGS. 8A-8E illustrate diagrams showing generation of a third path plan and movement of a robot according to the third path plan in FIG. 1 according to an exemplary embodiment.

The third path plan generating unit 240 determines whether first path plan data exists in a second space B within a second predetermined distance from the current location of the robot. If first path plan data does not exist in the second space B, the third path plan generating unit 240 generates a third path plan. Here, the second space B is indicated as a circle in FIG. 8A, where the predetermined distance to form the second space B from the current location of the robot is set in advance in consideration of velocity of the robot and size of an obstacle. FIG. 8A shows that the second space B is different from the first space A shown in FIGS. 7A-7C. However, the first space A and the first space B may be set to be the same by setting the first and second predetermined distances to be the same, according to an exemplary embodiment.

The third path plan generating unit 240 generates the third path plan in a case where first path plan data does not exist in the second space B, as shown in FIG. 8A. Here, the first path plan may include the at least one first node 70 and the at least one edge 71 interconnecting the arbitrary first nodes 70.

The third path plan generating unit 240 performs the second algorithm, that is, the PRM algorithm, in the space B, and generates a roadmap by using at least one second node 80, that is, a collision-avoiding point.

Figure 8B:
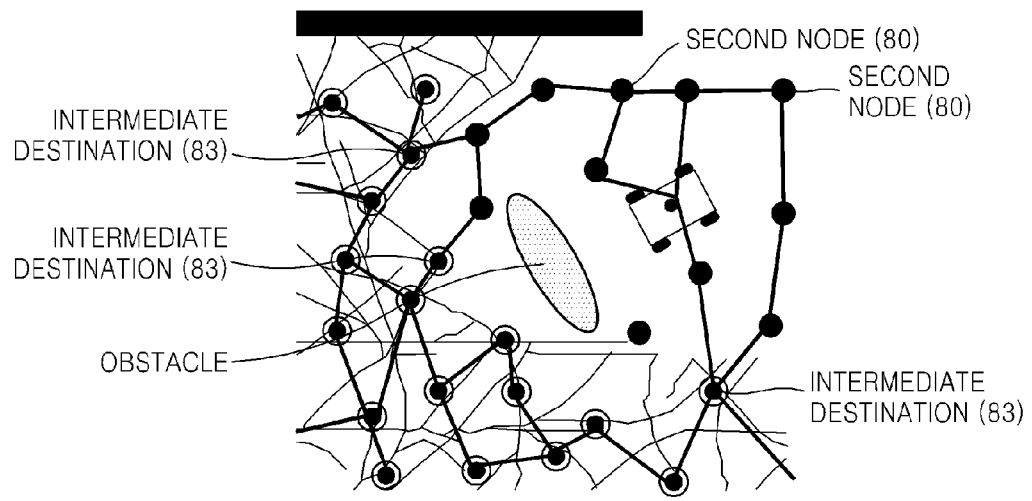

Furthermore, the third path plan generating unit 240 sets a location, at which the second node 80 inside the space B and the first node 70 outside the space B meet, as an intermediate destination 83. Here, if the first node 70 exists around the second node 80, the second node 80 may be moved to the first node 70. FIG. 8B is a diagram showing the intermediate destination 83 set at a location, at which the second node 80 and the first node 70 meet, in detail.

Figure 8C:
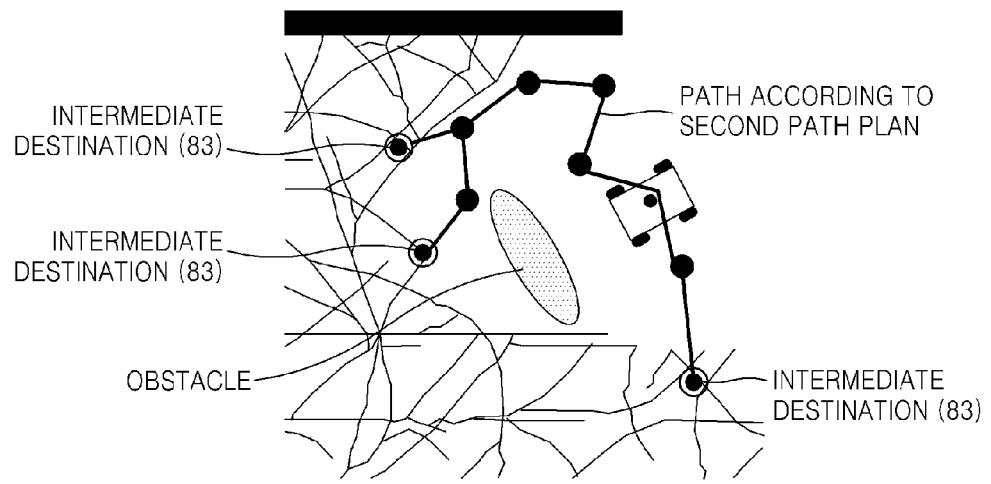

Next, the third path plan generating unit 240 generates an intermediate destination path plan from the current location of the robot to the intermediate destination 83. To generate the intermediate destination path plan from the current location of the robot to the intermediate destination 83, the third path plan generating unit 240 generates at least one intermediate destination path plan by performing the first algorithm, that is, the RRT algorithm. FIG. 8C shows an intermediate destination path plan from the current location of the robot to the intermediate destination 83 that is generated by using the RRT algorithm.

The third path plan generating unit 240 selects the most efficient intermediate destination path plan from among the at least one intermediate destination path plan.

Figure 8D:
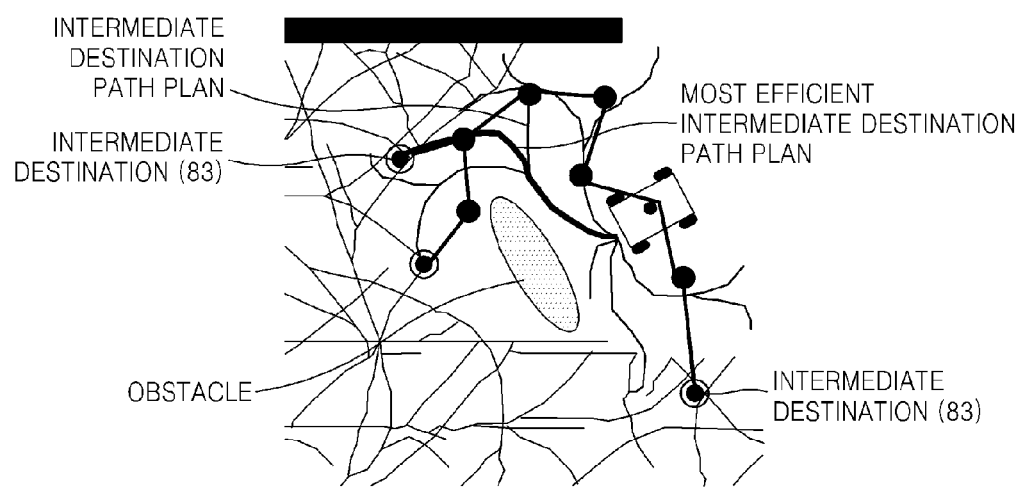

Here, the most efficient intermediate destination path plan may be a path plan corresponding to the lowest operating cost, in a case where costs (distances, scores, etc.) for operating the robot are calculated with respect to at least one path from the current location of the robot to the intermediate destination 83. However, the exemplary embodiment is not limited thereto. The PRM algorithm rapidly performs collision check and may reduce a period of time elapsed for path calculation by avoiding calculation of precise illustration of a C-space. FIG. 8D shows the most efficient intermediate destination path plan from the current location of the robot to the intermediate destination.

The third path plan generating unit 240 generates a final third path plan from the current location of the robot to the final destination via the selected intermediate destination path. In other words, the final third path plan is a path plan for operating the robot from the starting point $q_{int}$ according to the first path plan before the obstacle is discovered, operating the robot to the intermediate destination according to the third path plan after the obstacle is discovered, and operating the robot from the intermediate destination to the final destination.

Figure 8E:
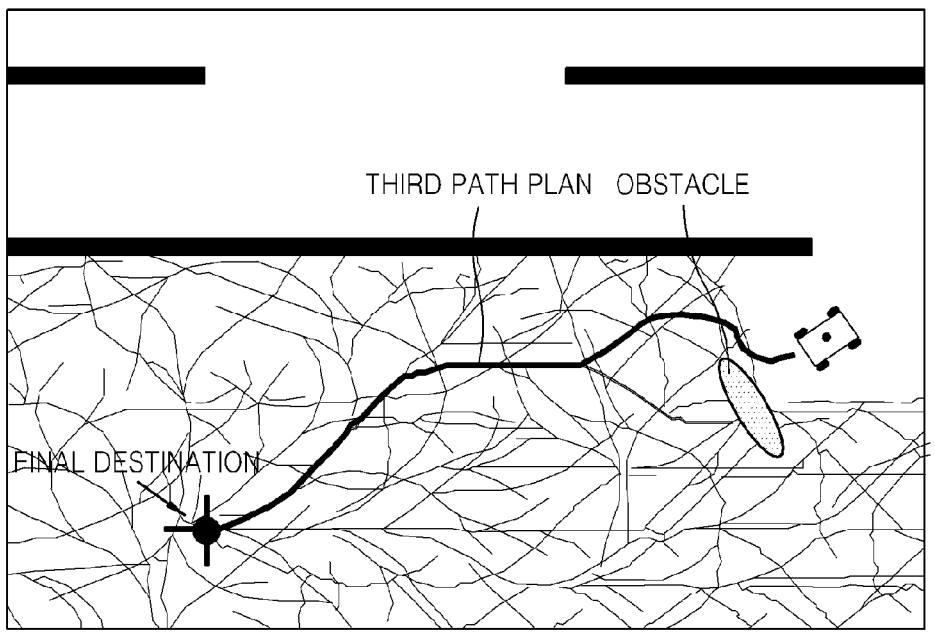

After the third path plan is generated, the third path plan generating unit 240 updates the map generating unit 300. The third path plan generated by the third path plan generating unit 240 is output to the robot control unit 400, the robot control unit 400 outputs control signals for operating the robot by using the third path plan, and the operating unit 500 operates the robot according to the control signals based on the third path plan. FIG. 8E is a diagram showing operation of a robot according to a third path plan.

As described above, when an obstacle is discovered during operation of a robot, the robot may be operated smoothly and naturally by generating a path plan without considering non-holonomic constraint and generating a final path plan based on the generated path plan in consideration of kinetics.

Hereinafter, a method of planning a path of a robot according to an exemplary embodiment will be described with reference to FIGS. 9 through 11, where any descriptions already given above with respect to FIGS. 1 through 8 will be omitted. A path plan for a robot is generated by the path plan generating unit 200. Path plan signals output by the path plan generating unit 200 are output to the robot control unit 400 and the operating unit 500, thereby operating the robot. For convenience of explanation, it will be assumed below that the path plan generating unit 200 operates a robot.

Figure 9:
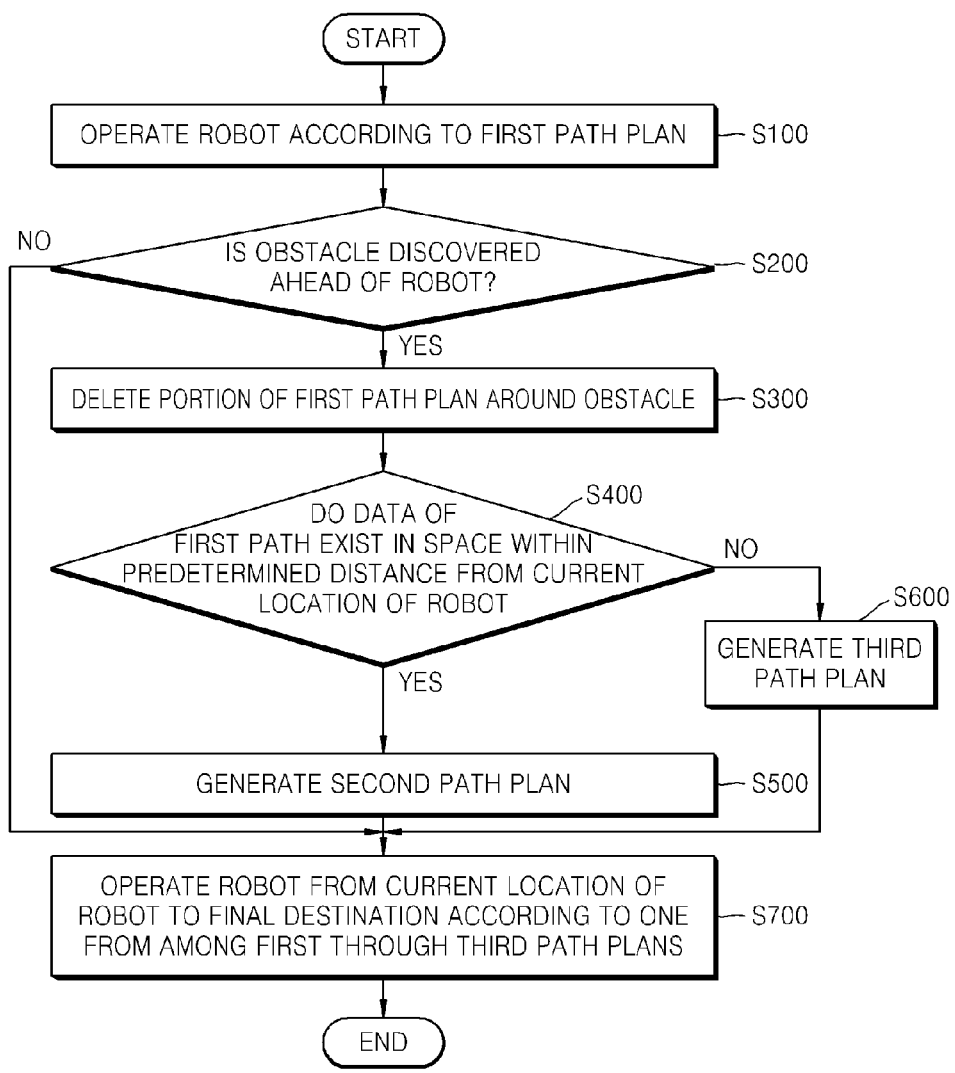
FIG. 9 is a flowchart showing a method of planning a path of a robot according to an exemplary embodiment.

FIG. 9 is a flowchart showing a method of planning a path of a robot according to an exemplary embodiment.

Referring to FIG. 9, the path plan generating unit 200 performs an operation S100 for operating a robot according to a first path plan from among a plurality of path plans generated based on an environment map by using the RRT algorithm.

The path plan generating unit 200 performs an operation S200 for determining discovery of an obstacle ahead while the robot is being operated according to the first path plan.

Here, if an obstacle is discovered ahead of the robot, the path plan generating unit 200 performs an operation S300 for deleting a portion of the first path plan around the obstacle.

When the portion of the first path plan around the obstacle is deleted, the path plan generating unit 200 performs an operation S400 for determining whether first path plan data (nodes and edges) exists in a space A within a first predetermined distance from the current location of the robot.

If first path plan data exists in the space A, the path plan generating unit 200 performs an operation S500 for generating a second path plan. According to an exemplary embodiment, the first path plan may be maintained without a portion of the first path plan being deleted for a later use, for example, in a case where the obstacle is removed.

Figure 10:
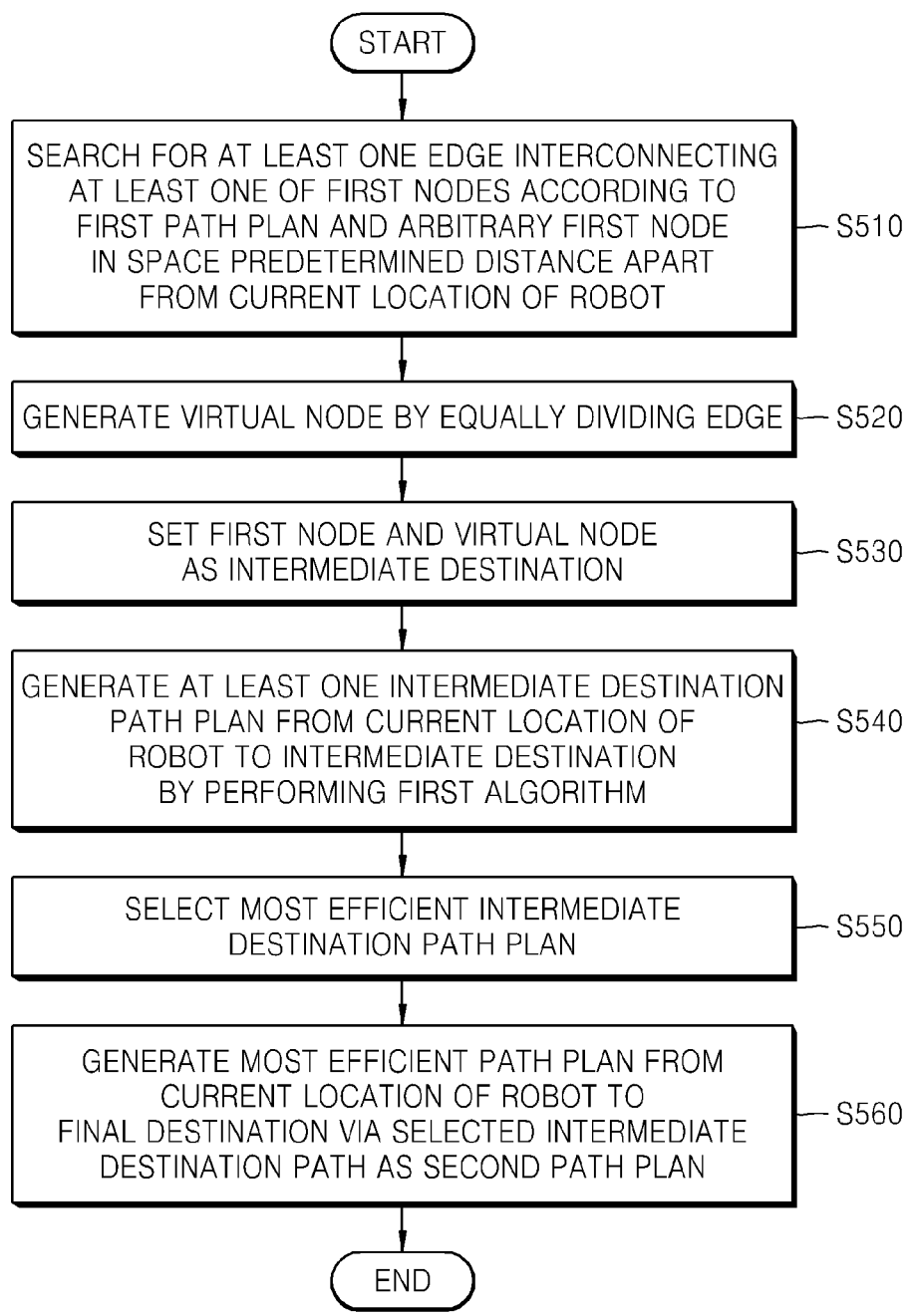
FIG. 10 is a flowchart showing a method of generating the second path plan in detail according to an exemplary embodiment.

FIG. 10 is a flowchart showing a method of generating the second path plan in detail. Referring to FIG. 10, the path plan generating unit 200 performs an operation S510 for searching for at least one edge interconnecting at least one of the first nodes 70 according to the first path plan and an arbitrary first node in the space A within a first predetermined distance from the current location of the robot. If at least one first node and at least one edge are found, the path plan generating unit 200 performs an operation S520 for equally dividing the edge and generates a virtual node. Next, the path plan generating unit 200 performs an operation S530 for setting the first node and the virtual node as an intermediate destination and performs an operation S540 for generating an intermediate destination path plan from the current location of the robot to the intermediate destination by performing a first algorithm, that is, the RRT algorithm. The path plan generating unit 200 performs an operation S550 for selecting the most efficient intermediate destination path plan from among at least one intermediate destination path plan. Next, the path plan generating unit 200 performs an operation S560 for generating the most efficient path from among paths from the current location of the robot to the final destination via the intermediate destination paths as a second path plan.

Referring back to FIG. 9, if first path plan data does not exist in the space A, the path plan generating unit 200 performs an operation S600 for generating a third path plan.

Figure 11:
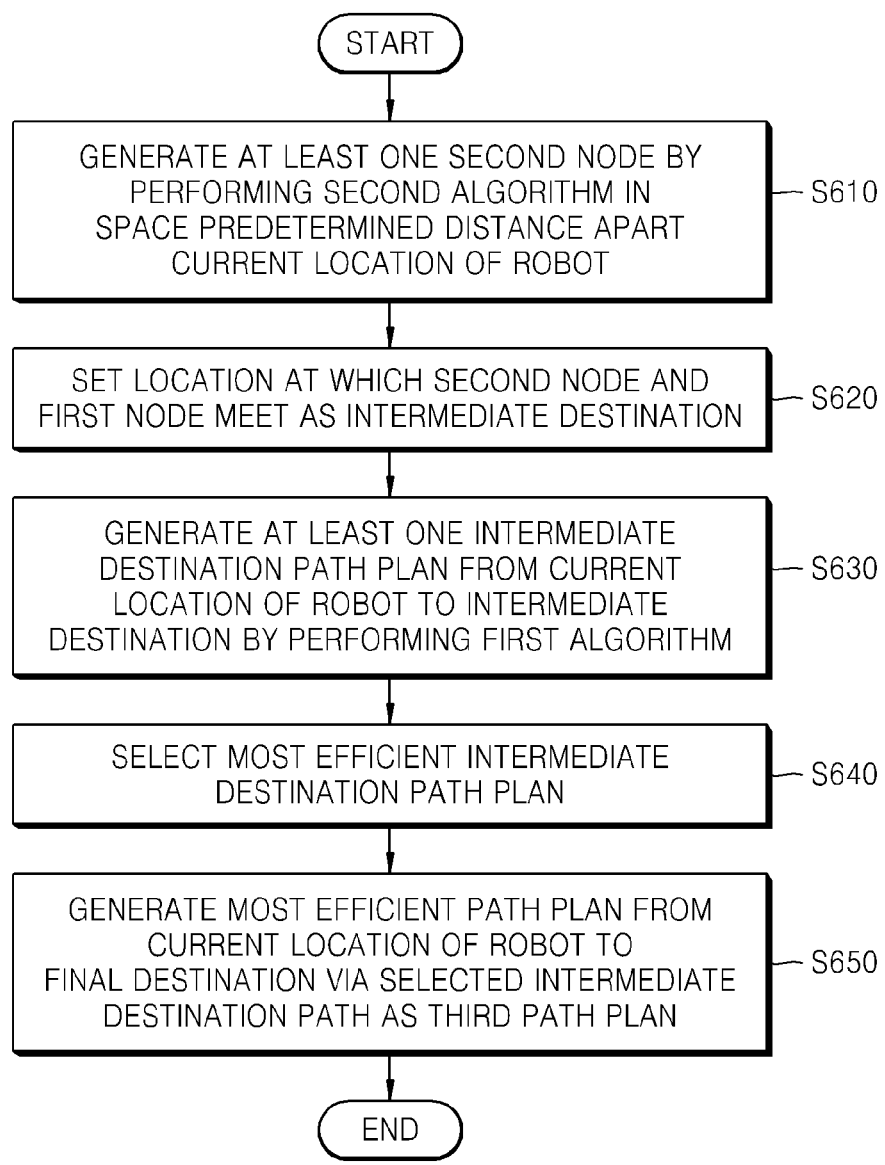
FIG. 11 is a flowchart showing a method of generating the third path plan in detail according to an exemplary embodiment.

FIG. 11 is a flowchart showing a method of generating the third path plan in detail. Referring to FIG. 11, the path plan generating unit 200 performs an operation S610 for generating at least one roadmap using at least one second node by performing a second algorithm, that is, the PRM algorithm in a space B within a second predetermined distance from the current location of a robot. Next, the path plan generating unit 200 performs an operation S620 for setting a location at which the second node and the first node meet as an intermediate destination. After the intermediate destination is set, the path plan generating unit 200 performs an operation S630 for generating at least one intermediate destination path plan from the current location of the robot to the intermediate destination by performing the first algorithm, that is, the RRT algorithm. The path plan generating unit 200 performs an operation S640 for selecting the most efficient intermediate destination path plan from among at least one intermediate destination path plan. Next, the path plan generating unit 200 performs an operation S650 for generating the most efficient path from among paths from the current location of the robot to the final destination via the intermediate destination paths as a third path plan.

Referring back to FIG. 9, when the second path plan or the third path plan is generated, the path plan generating unit 200 performs an operation S700 for operating the robot from the current location of the robot to the final destination according to either the second path plan or the third path plan. The operation S700 also includes an operation for operating the robot continuously according to the first path plan in a case where no obstacle is discovered ahead of the robot.

As described above, according to the one or more of the above exemplary embodiments, a period of time elapsed for generating a path of a robot may be reduced and stability of operation of a robot may be improved by generating a path of the robot by re-using previously searched paths.

Furthermore, a robot may be operated smoothly and naturally by generating a path plan of the robot without considering non-holonomic constraint and generating a final path plan based on the generated path plan in consideration of kinetics.

In addition, other exemplary embodiments can also be implemented through computer readable code/instructions in/on a medium, e.g., a computer readable medium, to control at least one processing element to implement any above described embodiment. The medium can correspond to any medium/media permitting the storage and/or transmission of the computer readable code.

While exemplary embodiments have been particularly shown and described above, it would be understood by those skilled in the art that various changes may be made therein without departing from the principles and spirit of the present inventive concept, as defined by the following claims.

What is claimed is:

1. A method of planning a path of a robot, the method comprising:
   operating the robot according to a first path;
   generating a second path based on data of the first path if an obstacle is discovered around the robot while the robot is being operated according to the first path, and the data of the first path exist in a first space within a first distance from a current location of the robot;
   generating a third path without using the data of the first path if the obstacle is discovered around the robot while the robot is being operated according to the first path, and the data of the first path do not exist in a second space within a second distance from the current location of the robot; and
   operating the robot according to the second path or the third path.

2. The method of claim 1, further comprising operating the robot according to the first path if no obstacle is discovered.

3. The method of claim 1, further comprising deleting at least a portion of the first path around the obstacle if the obstacle is discovered around the robot while the robot is being operated according to the first path.

4. The method of claim 1, wherein the generating the second path comprises:
   detecting at least one edge interconnecting at least one of first nodes of the first path and an arbitrary first node in the first space; generating a virtual node by equally dividing the at least one edge;

setting each of the first node and the virtual node as an intermediate destination;

generating an intermediate destination path from the current location of the robot to the intermediate destination; and generating the second path from the current location of the robot to a final destination via the intermediate destination.

5. The method of claim 4, wherein the generating the intermediate destination path comprises generating at least one intermediate destination path from the current location of the robot to the intermediate destination by performing a first algorithm.

6. The method of claim 1, wherein the first distance and the second distance are set to be the same.

7. The method of claim 1, wherein the generating the third path comprises:

generating at least one node in the second space;

setting a location at which the at least one node and another node outside the second space meet as an intermediate destination;

generating an intermediate destination path from the current location of the robot to the intermediate destination; and generating the third path from the current location of the robot to a final destination via the intermediate destination path.

8. The method of claim 7, wherein the generating the intermediate destination path comprises generating at least one intermediate destination path from the current location of the robot to the intermediate destination by performing an algorithm which is different from an algorithm used to generate the at least one node in the second space.

9. A non-transitory computer readable recording medium having recorded thereon a computer program for implementing the method of claim 1.

10. A robot path planning apparatus comprising:

a robot operation controller configured to operate a robot according to a first path; and a path plan generator configured to generate a second path based on data of the first path if an obstacle is discovered around the robot while the robot is being operated according to the first path, and the data of the first path exist in a first space within a first distance from a current location of the robot, and configured to generate a third path without using the data of the first path if the obstacle is discovered around the robot while the robot is being operated according to the first path, and the data of the first path do not exist in a second space within a second distance from the current location of the robot, wherein the robot operation controller is configured to operate the robot according to the second or the third path.

11. The robot path planning apparatus of claim 10, wherein the first distance and the second distance are set to be the same.

12. The robot path planning apparatus of claim 10, wherein the path plan generator is further configured to delete at least a portion of the first path around the obstacle if the obstacle is discovered around the robot while the robot is being operated according to the first path.

13. The robot path planning apparatus of claim 10, wherein the path plan generator is configured to output a signal for maintaining the first path to the robot operation control unit if no obstacle is discovered.

14. The robot path planning apparatus of claim 10, wherein the path plan generator is configured to generate the second path from the current location of the robot to a final destination via an intermediate destination by setting each of at least one first node according to the first path and a virtual node generated by equally dividing an edge interconnecting arbitrary first nodes as the intermediate destination, generate an intermediate destination path from the current location of the robot to the intermediate destination, and generate the second path from the current location of the robot to the final destination via the intermediate destination.

15. The robot path planning apparatus of claim 14, wherein the path plan generator is configured to generate the intermediate destination path from the current location of the robot to the intermediate destination by performing a rapidly exploring random tree (RRT) algorithm.

16. The robot path planning apparatus of claim 10, wherein the path plan generator is configured to generate the third path by generating at least one node in the second space, set a location at which the at least one node and another node outside the second space meet as an intermediate destination, generating an intermediate destination path from the current location of the robot to the intermediate destination, and generate the third path from the current location of the robot to a final destination via the intermediate destination path.

17. The robot path planning apparatus of claim 16, wherein the path plan generator is configured to generate the intermediate destination path from the current location of the robot to the intermediate destination by performing an algorithm which is different from an algorithm used to generate the at least one node in the second space.

18. A robot including the robot path planning apparatus of claim 10.

* * * * *